F. W. HEIAFFEL.
FEED BAG.
APPLICATION FILED MAY 3, 1915. RENEWED FEB. 29, 1916.
1,183,563.  Patented May 16, 1916.
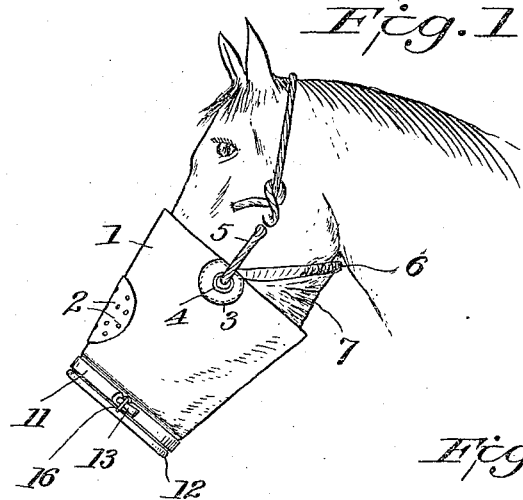
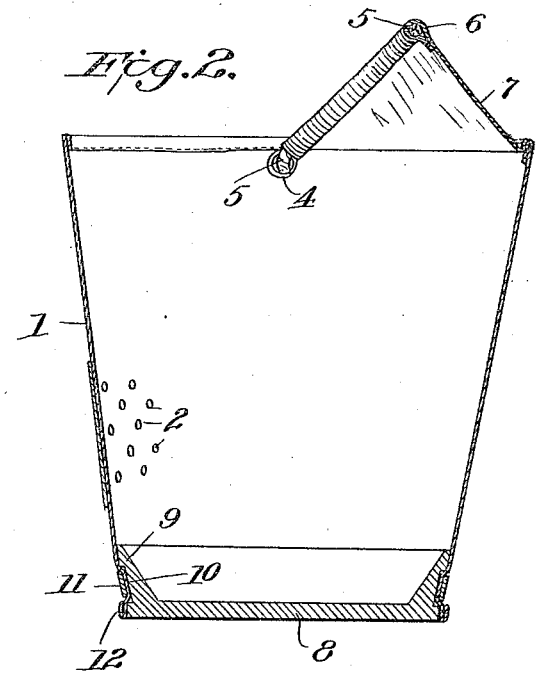
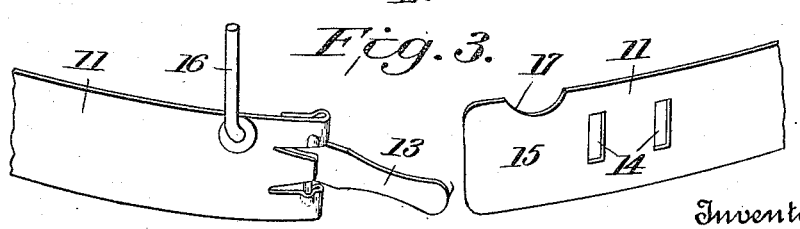

UNITED STATES PATENT OFFICE.

FREDERICK W. HEIAFFEL, OF NEW YORK, N. Y.

FEED-BAG.

1,183,563.  Specification of Letters Patent. Patented May 16, 1916.

Application filed May 3, 1915, Serial No. 25,543. Renewed February 29, 1916. Serial No. 81,288.

*To all whom it may concern:*

Be it known that I, FREDERICK W. HEIAFFEL, a citizen of the United States, residing at New York, in the county and State of New York, have invented certain new and useful Improvements in Feed-Bags, of which the following is a full, clear, and exact specification.

This invention relates to feed bags for animals, and especially to the type of feed bag which is adapted to be secured to the animal's head.

One object of the invention is to prevent the loss of food when the animal raises his head, as he often does in an effort to reach the last of the feed in the bottom of the bag.

Another object is to provide an improved bottom for feed bags which is so shaped as to facilitate the extraction of the last morsels by the animal so that there will be no waste.

A further object is to provide improved means for detachably securing the bottom to the bag.

Other objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views: Figure 1 is a side view of the bag attached to the head of a horse. Fig. 2 is a vertical section through the bag, and Fig. 3 is a detail view of the locking device on the ends of the band which is used for fastening the bottom in the bag.

The body 1 of the bag may be made of canvas and is open at both ends, while in the front thereof there are arranged the usual air inlet openings 2. The side portions of the upper edge of the bag are reinforced by pieces of leather 3, or other suitable material, and in said reinforced portions are placed metal eyelets 4 through which an attaching rope 5 is passed. The intermediate portion of the rope, that is, the portion extending between the eyelets 4, is inclosed in a tubular casing 6 formed at the edge of a skirt portion 7, also preferably made of canvas and secured to the inner portion of the top edge of the bag. This skirt portion extends around the upper edge of the bag from the eyelet 4 on one side to the eyelet on the other side and projects inwardly so as to partly close the top of the bag. It will be noted that this skirt portion is arranged at the inner or rear side of the bag so that it comes below the animal's jaw when the bag is attached, as illustrated in Fig. 1. When the rope 5 is adjusted to fasten the bag to the animal's head, it automatically draws the edge of the skirt portion closely up under and around the animal's jaw, so that none of the feed will be lost when the animal throws up his head, it being common for considerable quantities of feed to escape at such times when the old forms of bags are used.

The body of the bag is preferably tapered, its lower end being smaller than its upper end. Into the lower end of the bag there is fitted a bottom piece 8 which may be made of metal, papier mâché or other non-absorbing material, and is pan-shaped, with a flared rim 9 having a circumferential groove 10 in its outer face. This bottom pan is detachably secured in the bottom end of the bag by means of a metal band or hoop 11 which is clamped firmly around this portion of the bag and serves to press the part engaged thereby into the groove 10, as clearly shown in Fig. 2. The bottom pan is thus held securely in place and prevented from moving either out of the bottom end of the body portion 1 or up into the middle portion of said body. The upward movement of the bottom piece is further prevented by the outwardly turned hem 12 around the bottom of the body portion of the bag, which hem abuts against, or is presented to the lower edge of the hoop 11.

The ends of the hoop 11 are detachably connected by means of a lever clamp 13 pivoted to one end and passed through an opening 14 spaced from the extremity of the other end. When secured, the clamping lever 13 overlies the end portion 15 of the hoop having the opening 14, the end of said lever extending near to the extremity of said end 15 of the hoop. A swiveled locking arm or finger 16 is carried by the end of the hoop on which the lever is mounted, and the upper edge of the end 15 of said hoop is recessed or cut away, as at 17, to allow clearance for said locking finger. It will be noted that the position of the locking finger with respect to the overlapping end 15 of the band or hoop, and the clamping lever 13 is such that when said finger is in vertically depending locking position, it overlies the lever as well as the end portion 15 of the hoop and holds them both firmly against the other end of said hoop.

Having thus described my invention, what I claim as new and desire to secure by Letters Patent of the United States is:—

1. A feed bag having a skirt portion at its upper edge, and a rope for supporting the bag from an animal's head, said rope having a portion thereof passed as a gathering means through the edge portion of the skirt portion, whereby the weight of the bag and its contents will serve to automatically draw the skirt portion closely in under and around the animal's jaw when the bag is fastened in position.

2. A feed bag having a skirt portion provided with a casing along its edge, and a rope for supporting the bag from an animal's head, said rope having a portion passed through said casing, whereby the weight of the bag and its contents will serve to automatically draw the skirt portion closely in under and around the animal's jaw when the bag is fastened in position.

3. A feed bag having eyelets at the sides of its upper edge portion, a skirt portion extending upward and inward from the upper edge of the bag between said eyelets, and a rope for supporting the bag from an animal's head, said rope having a portion thereof passed as a gathering means through the edge portion of said skirt portion and through said eyelets, whereby the weight of the bag and its contents will serve to automatically draw the skirt portion closely in under and around the animal's jaw when the bag is fastened in position.

4. A feed bag having eyelets at the sides of its upper edge portion, a skirt portion extending upward and inward from the upper edge of the bag between said eyelets and having a casing along its margin, and a rope for supporting the bag from an animal's head, said rope having a portion thereof passed through said eyelets and casing, whereby the weight of the bag and its contents will serve to automatically draw the skirt portion closely in under and around the animal's jaw when the bag is fastened in position.

In testimony whereof I have signed my named to this specification.

FREDERICK W. HEIAFFEL.

Copies of this patent may be obtained for five cents each, by addressing the "Commissioner of Patents, Washington, D. C."